(12) United States Patent
Cooper

(10) Patent No.: US 12,410,800 B2
(45) Date of Patent: Sep. 9, 2025

(54) COUPLING AND ROTOR SHAFT FOR MOLTEN METAL DEVICES

(71) Applicant: Molten Metal Equipment Innovations, LLC, Middlefield, OH (US)

(72) Inventor: Paul V. Cooper, Chesterland, OH (US)

(73) Assignee: Molten Metal Equipment Innovations, LLC, Middlefield, OH (US)

( * ) Notice: Subject to any disclaimer, the term of this patent is extended or adjusted under 35 U.S.C. 154(b) by 543 days.

(21) Appl. No.: 16/533,404

(22) Filed: Aug. 6, 2019

(65) Prior Publication Data

US 2019/0360492 A1 Nov. 28, 2019

Related U.S. Application Data

(62) Division of application No. 14/791,137, filed on Jul. 2, 2015, now Pat. No. 10,465,688.

(60) Provisional application No. 62/020,332, filed on Jul. 2, 2014.

(51) Int. Cl.
| | |
|---|---|
| *F04D 7/06* | (2006.01) |
| *C22B 7/00* | (2006.01) |
| *C22B 9/00* | (2006.01) |
| *F04D 29/20* | (2006.01) |
| *F16D 1/02* | (2006.01) |
| *F16D 1/10* | (2006.01) |
| *F27D 3/14* | (2006.01) |
| *F27D 3/16* | (2006.01) |
| *F27D 17/30* | (2025.01) |
| *F27D 27/00* | (2010.01) |
| *F27D 99/00* | (2010.01) |
| *F16C 3/02* | (2006.01) |

(52) U.S. Cl.
CPC .............. *F04D 7/065* (2013.01); *C22B 7/003* (2013.01); *C22B 9/00* (2013.01); *F04D 29/20* (2013.01); *F16D 1/02* (2013.01); *F16D 1/10* (2013.01); *F27D 3/14* (2013.01); *F27D 3/16* (2013.01); *F27D 17/302* (2025.01); *F27D 27/005* (2013.01); *F27D 99/00* (2013.01); *F16C 3/02* (2013.01); *F16D 2001/102* (2013.01); *F27D 2099/0083* (2013.01); *Y02P 10/20* (2015.11)

(58) Field of Classification Search
CPC . F16D 1/02; F27D 27/005; F04D 7/06; F04D 7/065; F04D 13/021; F04D 29/0405; F04D 29/044; F04D 29/054
See application file for complete search history.

(56) References Cited

U.S. PATENT DOCUMENTS

| | | | |
|---|---|---|---|
| 2,035,282 A | 3/1936 | Schmeller | |
| 2,966,345 A | 12/1960 | Ciabattari | |
| 3,151,565 A | 10/1964 | Albertson et al. | |
| 3,258,283 A * | 6/1966 | Winberg | E21B 17/046 |
| | | | 403/379.4 |
| 4,545,887 A | 10/1985 | Amesen | |
| 4,685,822 A * | 8/1987 | Pelton | F16D 1/06 |
| | | | 403/343 |

(Continued)

*Primary Examiner* — Michael P Ferguson
(74) *Attorney, Agent, or Firm* — SNELL & WILMER L.L.P.

(57) ABSTRACT

A coupling has an opening and a protrusion extending downward from the opening. The protrusion has threads that are preferably positioned outside of the opening. A rotor shaft that connects to the coupling has an internal bore with threads that receives and retains the protrusion, such as by a threaded connection between the two, so the protrusion applies driving force to the shaft.

11 Claims, 9 Drawing Sheets

(56) References Cited

U.S. PATENT DOCUMENTS

| | | | |
|---|---|---|---|
| 4,954,167 A * | 9/1990 | Cooper | B01F 3/04539 |
| | | | 266/225 |
| 4,967,827 A | 11/1990 | Campbell | |
| 5,634,770 A * | 6/1997 | Gilbert | F04D 7/065 |
| | | | 415/216.1 |
| 5,676,520 A * | 10/1997 | Thut | G21C 15/247 |
| | | | 415/121.3 |
| 5,685,701 A * | 11/1997 | Chandler | F04D 7/065 |
| | | | 266/235 |
| 5,744,093 A | 4/1998 | Davis | |
| 5,758,712 A | 6/1998 | Pederson | |
| 6,358,467 B1 * | 3/2002 | Mordue | B22D 1/005 |
| | | | 222/602 |
| 7,273,582 B2 | 9/2007 | Mordue | |
| 7,731,891 B2 * | 6/2010 | Cooper | F04D 7/065 |
| | | | 266/239 |
| 7,841,379 B1 | 11/2010 | Evans | |
| 9,074,601 B1 | 7/2015 | Thut | |
| 9,494,366 B1 | 11/2016 | Thut | |
| 10,428,821 B2 | 10/2019 | Cooper | |
| 10,570,745 B2 | 2/2020 | Cooper | |
| 10,641,270 B2 | 5/2020 | Cooper | |
| 2011/0140318 A1 | 6/2011 | Reeves et al. | |
| 2017/0106441 A1 | 4/2017 | Vincent | |
| 2017/0130298 A1 | 5/2017 | Teranishi et al. | |
| 2020/0360989 A1 | 11/2020 | Cooper | |
| 2020/0362865 A1 | 11/2020 | Cooper | |
| 2020/0363128 A1 | 11/2020 | Cooper | |

* cited by examiner

COUPLING AND ROTOR SHAFT FOR MOLTEN METAL DEVICES

CROSS REFERENCE TO RELATED APPLICATION

This application is divisional of and claims priority to U.S. patent application Ser. No. 14/791,137 entitled "Coupling and Rotor Shaft for Molten Metal Devices," filed on Jul. 2, 2015 which is a non-provisional of and claims priority to U.S. Provisional Application Ser. No. 62/020,332 entitled "Coupling and Rotor Shaft for Molten Metal Devices, filed on Jul. 2, 2014, the contents of each of the foregoing applications are incorporated herein in their entirety for all purposes.

FIELD OF THE INVENTION

The invention relates to couplings and rotor shafts that may be used in various devices, such as pumps, degassers and scrap melters used in molten metal.

BACKGROUND OF THE INVENTION

As used herein, the term "molten metal" means any metal or combination of metals in liquid form, such as aluminum, copper, iron, zinc and alloys thereof. The term "gas" means any gas or combination of gases, including argon, nitrogen, chlorine, fluorine, freon, and helium, that are released into molten metal.

Known molten-metal pumps include a pump base (also called a housing or casing), one or more inlets (an inlet being an opening in the housing to allow molten metal to enter a pump chamber), a pump chamber, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive system is typically an impeller shaft connected to one end of a drive shaft, the other end of the drive shaft being connected to a motor. Often, the impeller shaft is comprised of graphite, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,123,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Most often, circulation pumps are used in a reverbatory furnace having an external well. The well is usually an extension of the charging well where scrap metal is charged (i.e., added).

Transfer pumps are generally used to transfer molten metal from the one structure to another structure such as a ladle or another furnace.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the connector of the impeller.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Generally a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

Numerous rotor shaft to motor shaft couplings are known. A problem with the couplings, however, is that by applying driving force to the rotor shaft the rotor shaft tends to break at the location where the force is being applied. This is typically at the location where the coupling and rotor shaft are in contact, and the broken end of the rotor shaft must often be chiseled out of an opening in the coupling in which it is retained.

SUMMARY OF THE INVENTION

The present invention helps to alleviate the afore-mentioned problems by providing a coupling and rotor shaft for use in a molten metal pump, a molten metal rotary degasser or a molten metal scrap melter. The coupling has a collar with a cavity open at the bottom and a protrusion extending out of the cavity. The protrusion is preferably threaded along at least part of its length, wherein the threaded portion(s) are preferably outside of the cavity.

The rotor shaft preferably has a bore that receives the protrusion. Preferably the bore has internal threads that align with and receive the threads on the protrusion. Most preferably, there are no threads on the inner surface of the coupling opening or the outer surface of the rotor shaft.

With such a structure, if the rotor shaft breaks, it tends to break where the threads of the rotor shaft bore align with the threads of the protrusion, which is below the opening in the coupling. As a consequence, the broken piece of rotor shaft can either be unthreaded or chiseled off of the protrusion, each of which is simpler than chiseling a broken end out of the coupling opening.

The protrusion may have an internal passage for transferring gas therethrough and the rotor shaft passage may extend to the second end (or almost to the second end) to permit gas to be transferred therethrough.

DETAILED DESCRIPTION OF PREFERRED EMBODIMENTS

For any device described herein, any of the components that contact the molten metal are preferably formed by a material that can withstand the molten metal environment. Preferred materials are oxidation-resistant graphite and ceramics, such as silicon carbide. Oxidation-resistant graphite is most preferred because of its relatively low cost and ease of manufacturing.

Figure 1:
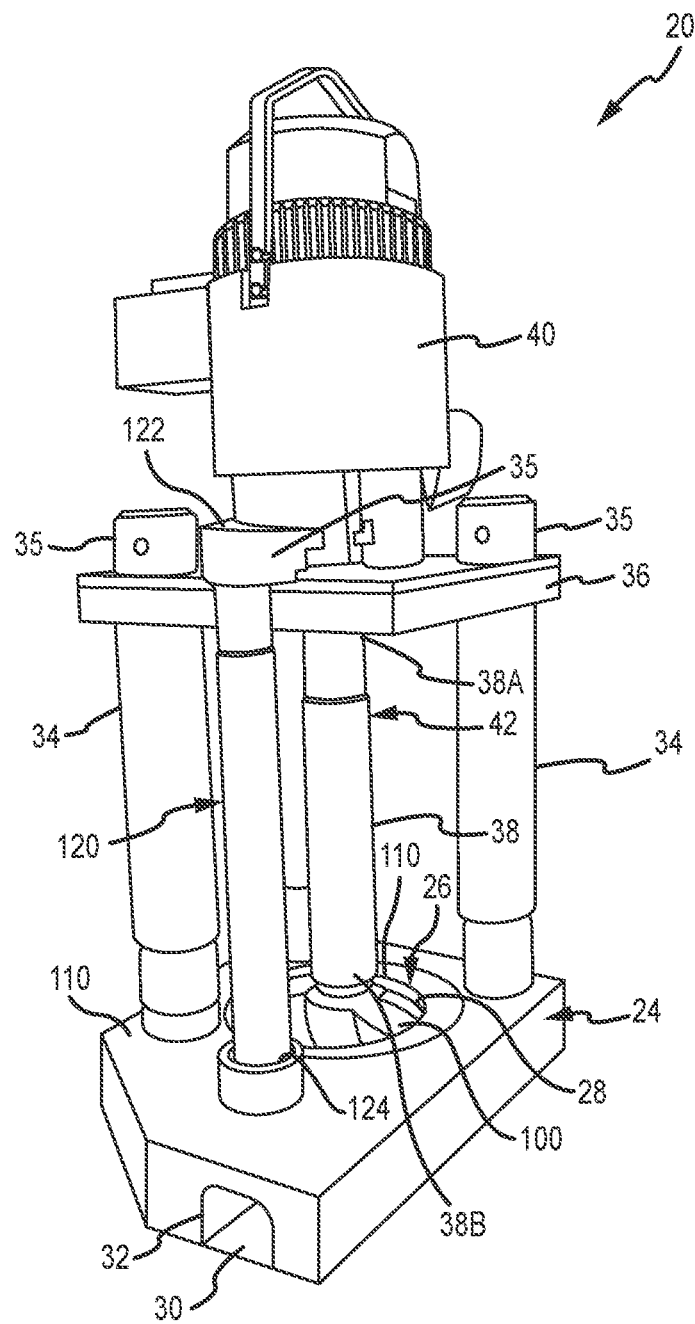
FIG. 1 is a perspective view of a pump for pumping molten metal, which may include a coupling and rotor shaft according to aspects of the invention.

Referring now to the drawing where the purpose is to illustrate and describe different embodiments of the invention, and not to limit same, FIG. 1 shows a molten metal pump 20 in accordance with an aspect of the present invention. Pump 20 is designed for operation in any environment in which molten metal is to be pumped or otherwise conveyed. Pump 20 can be any structure or device for pumping or otherwise conveying molten metal, such as the tangential-discharge pump disclosed in U.S. Letters Pat. No. 5,203,681 to Cooper, or an axial pump having an axial, rather than tangential, discharge. Pump 20 has a pump base 24 submersible in a molten metal bath B. In this embodiment, pump base 24 includes a generally nonvolute pump chamber 26, such as a cylindrical pump chamber or what has been called a "cut" volute although pump base 24 may have any shape pump chamber suitable of being used, such as a volute-shaped chamber. Chamber 26 may have only one opening, in either its top or bottom, since only one opening is required to introduce molten metal into pump chamber 26, although chamber 26 may have an opening in both its top and bottom. Generally, pump chamber 24 has two coaxial openings of the same diameter and usually one is blocked by a flow blocking plate mounted on the bottom of, or formed as part of, rotor 100. Base 24 further includes a tangential discharge 30 (although another type of discharge, such as an axial discharge, may be used) in fluid communication with chamber 26.

The invention is not limited to any particular type or configuration of pump base, or of even having a base. A pump, rotary degasser or scrap melter used with the invention could be of any size, design or configuration suitable for utilizing a rotor shaft and coupling according to the invention.

In the embodiment shown, one or more support posts 34 connect base 24 to a superstructure 36 of pump 20 thus supporting superstructure 36, although any structure or structures capable of supporting superstructure 36 may be used. Additionally, pump 20 could be constructed so there is no physical connection between the base and the superstructure, wherein the superstructure is independently supported, and/or there is no base. The motor, drive shaft and rotor could be suspended without a superstructure, wherein they are supported, directly or indirectly, to a structure independent of a pump base.

A motor 40, which can be any structure, system or device suitable for driving pump 20, but is preferably an electric, hydraulic or pneumatic motor, is positioned on superstructure 36 and is connected to a drive shaft 42. Drive shaft 42 can be any structure suitable for rotating the impeller 100, and preferably comprises a motor shaft (not shown) that connects to rotor shaft 44' via a coupling 500, which is described further below.

A rotor, also called an impeller, 100 is positioned at least partially within pump chamber 26. Preferred rotor 100 is preferably imperforate, and any type or shape of impeller suitable for use in a molten metal pump, rotary degasser or scrap melter, respectively, may be used to practice aspects of the invention. Rotor 100 has a connecting portion 110 to connect to a second end 44B' of rotor drive shaft 44'.

Figure 2:
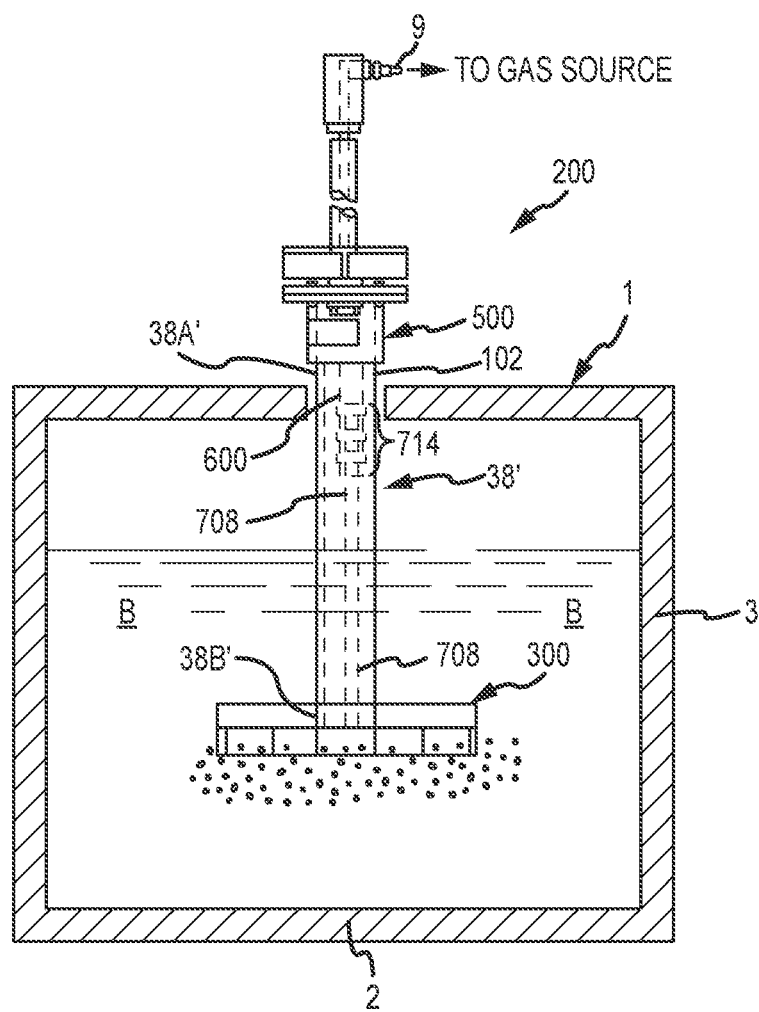
FIG. 2 shows a rotary degasser, which may include a coupling and rotor shaft according to aspects of the invention.

FIG. 2 shows a preferred gas-release device 200 according to the invention. Device 200 is designed to operate in a molten metal bath B contained within a vessel 1. Device 200 is preferably a rotary degasser and includes a rotor shaft 44, an impeller 300 and a drive source (not shown). Device 200 preferably also includes a coupling 500.

Figure 3:
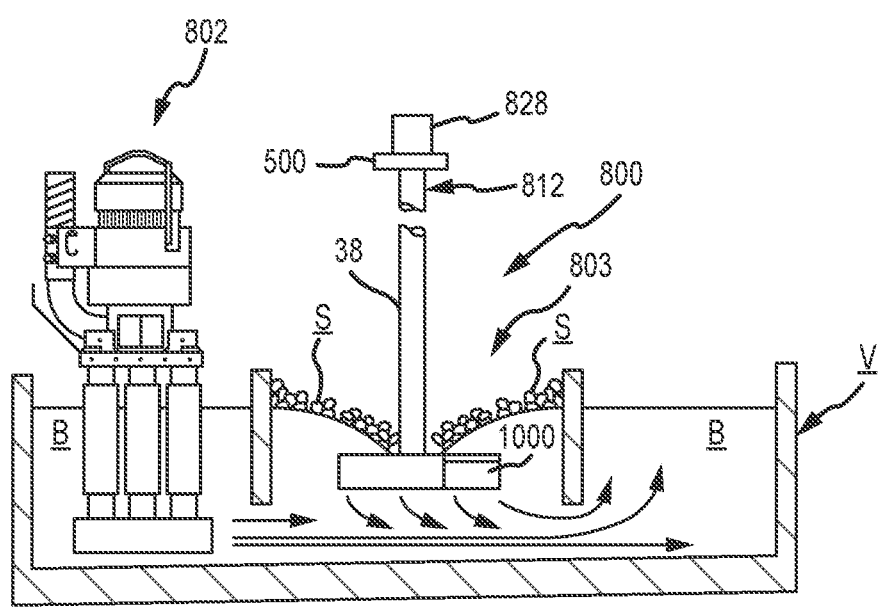
FIG. 3 shows a scrap melter, which may include a coupling and rotor shaft according to aspects of the invention.

FIG. 3 shows a scrap melter utilizing a coupling 500 and rotor drive shaft 44' in accordance with aspects of the invention.

Figure 4:
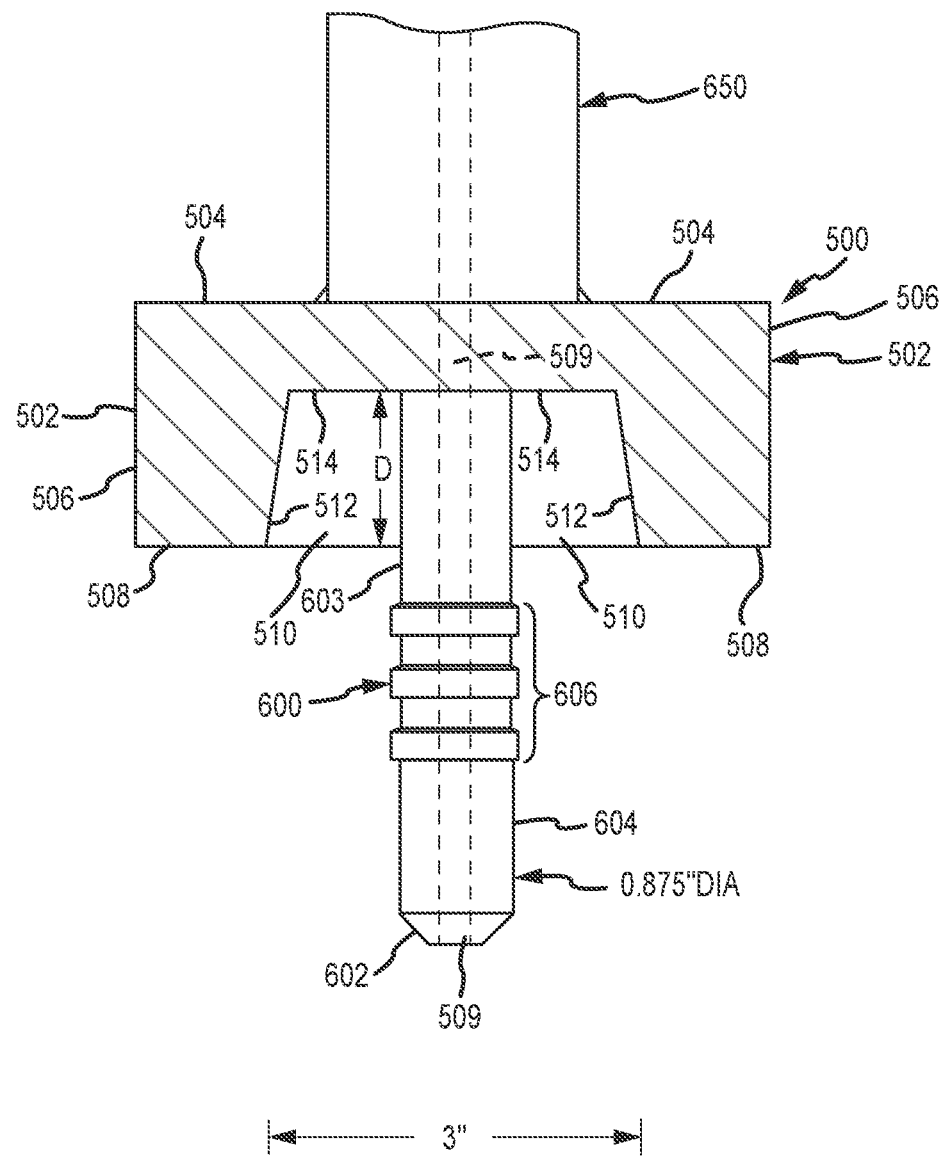
FIG. 4 is a side, cross-sectional view of a coupling that can be used in accordance with aspects of the invention.

Turning to FIG. 4, coupling 500 includes a collar 502, which as shown is circular with a flat top 504, an annular outer side wall 506, and a bottom edge 508. Two slots 505 are preferably formed on either side of collar 502 so collar 502 may be easily gripped and turned by a wrench. A passage 509 may be formed in collar 502 to permit gas to transfer therethrough. A cavity 510 is formed within coupling 500 in order to receive a first end 38A of rotor shaft 38, described further below. In one embodiment the coupling 500 is made of steel, has a height of about 2.5"-3" and an overall width of about 4½"-5½. Cavity 510 has a depth D of about 1-1½", and most preferably about 1¼", a diameter of about 3" next to bottom edge 508, and an inner wall 512 that slopes inward at between 5° and 10°, and most preferably about 7°, until it terminates at upper cavity wall 514. Inner wall 512 preferably is not threaded.

A projection 600 extends downward from upper cavity wall 514, through cavity 510 and projects outward therefrom. Projection 600 may be connected to collar 502 in any suitable manner, such as being threadingly received in an opening (not shown) or welded to collar 502. In one embodiment, projection 600 is between 0.800 and 1.000 inches in diameter, and preferably about 0.875" in diameter and extends outward from the bottom of cavity 510 (defined by where cavity 510 aligns with bottom edge 508) by between 2½"-3¾", and preferably 3¼". At the bottom end of projection 600 is preferably a chamfered end 602, that in the embodiment shown is ¼" long with a 45° chamfer. Projection 600 has an outer surface 604 with threads 606 that are preferably positioned outside of cavity 510. An upper portion 605 of projection 600 is positioned in cavity 510. As shown, the threads 606 preferably begin at a position about ½" beneath the lower portion of cavity 510, extend for about 1¼", and are 1" ACME threads, although any suitable length and type of thread may be used. Projection 600 may have an internal passage 509 therein for the passage of gas.

Coupling 500 may also include one extended metal portion 650 above coupling Section 502. The extended length of portion 650 reduces the cost of new and replacement rotor shafts (because they are shorter) and portion 650 is preferably between 4.5" and 12" in length. A top plate 660 mates with a known structure, such as a motor shaft with a rotary union, for driving the coupling 500 and injecting gas into it. Apertures 662 permit fasteners (not shown) to pass through and connect to a suitable driving structure, which is known in the art.

Figure 5:
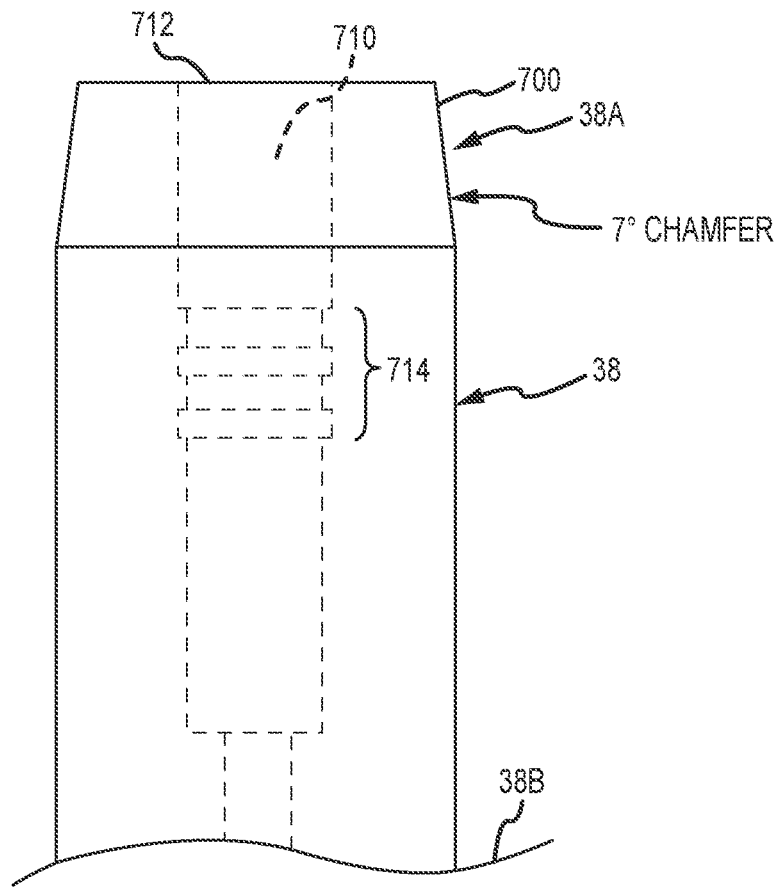
FIG. 5 is a partial side view of a rotor shaft that may be used according to aspects of the invention.
Figure 6:
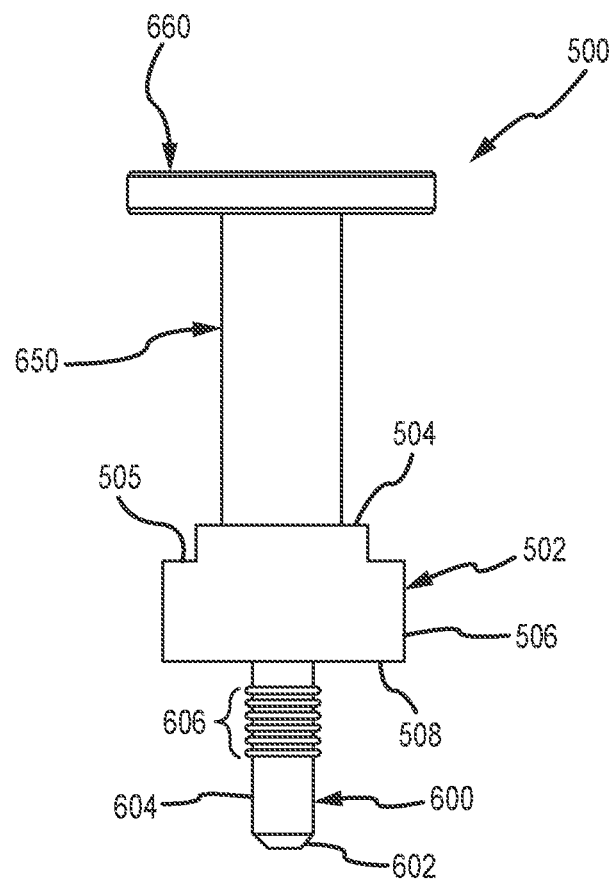
FIG. 6 is a side view of a coupling that may be used in accordance with aspects of the invention.
Figure 7:
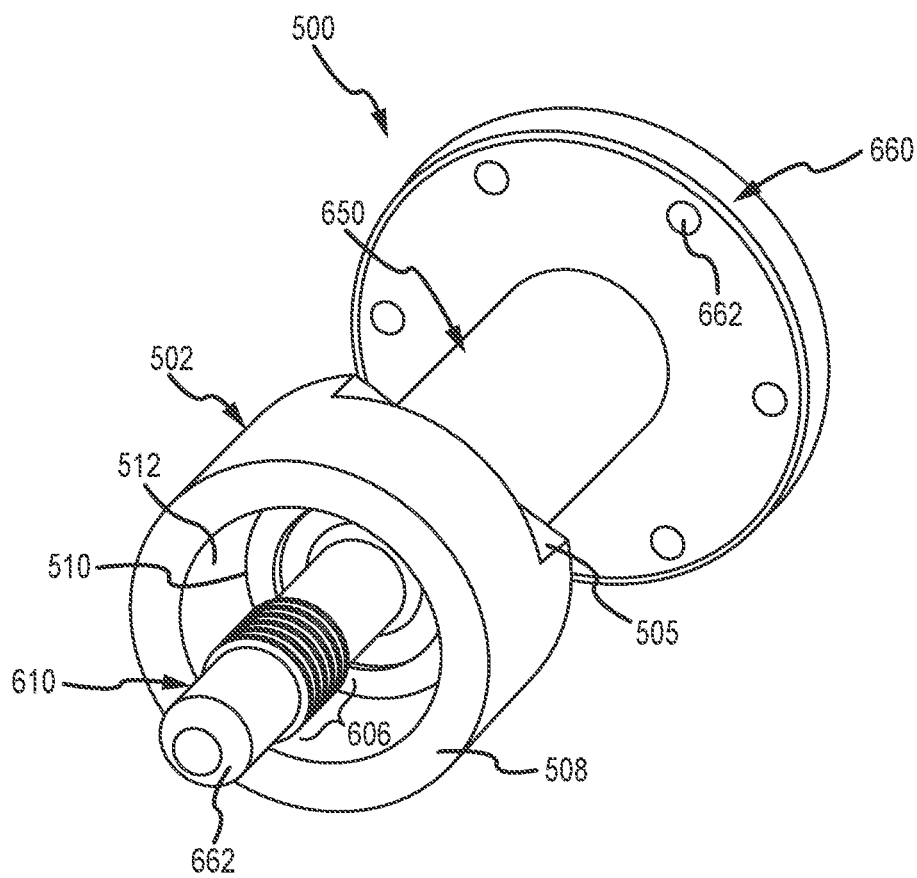
FIG. 7 is a side, perspective view of a coupling that may be used in accordance with aspects of the invention.
Figure 8:
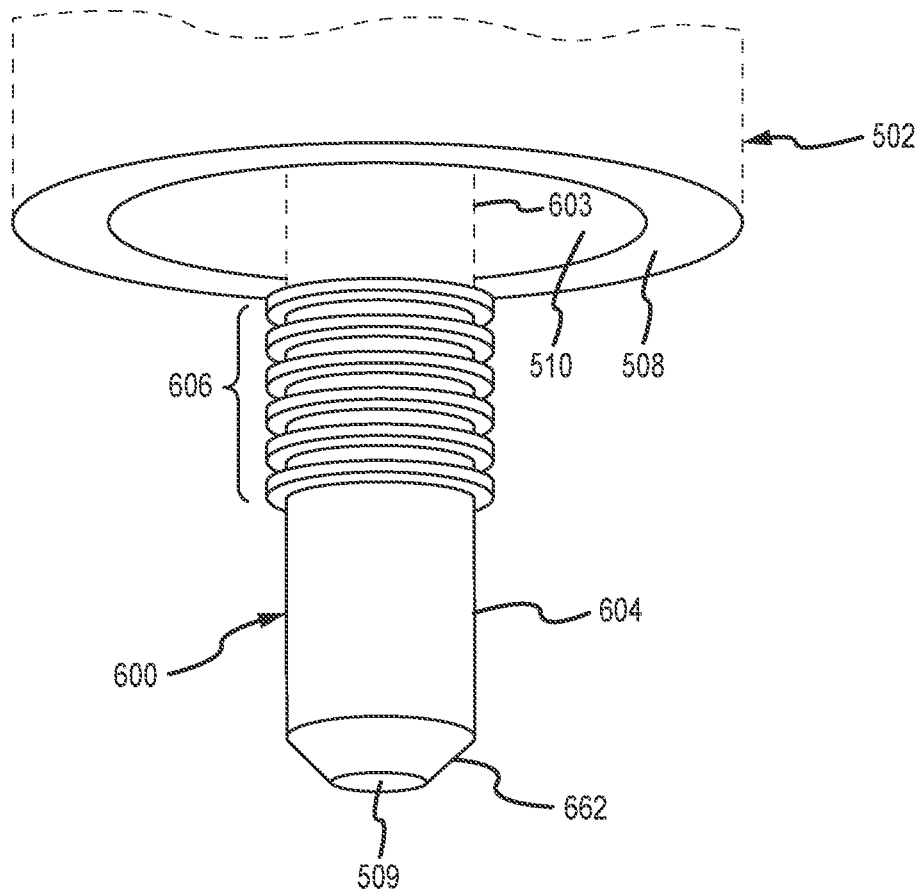
FIG. 8 is a partial side view of the lower portion of the coupling shown in in FIGS. 6 and 7.
Figure 10:
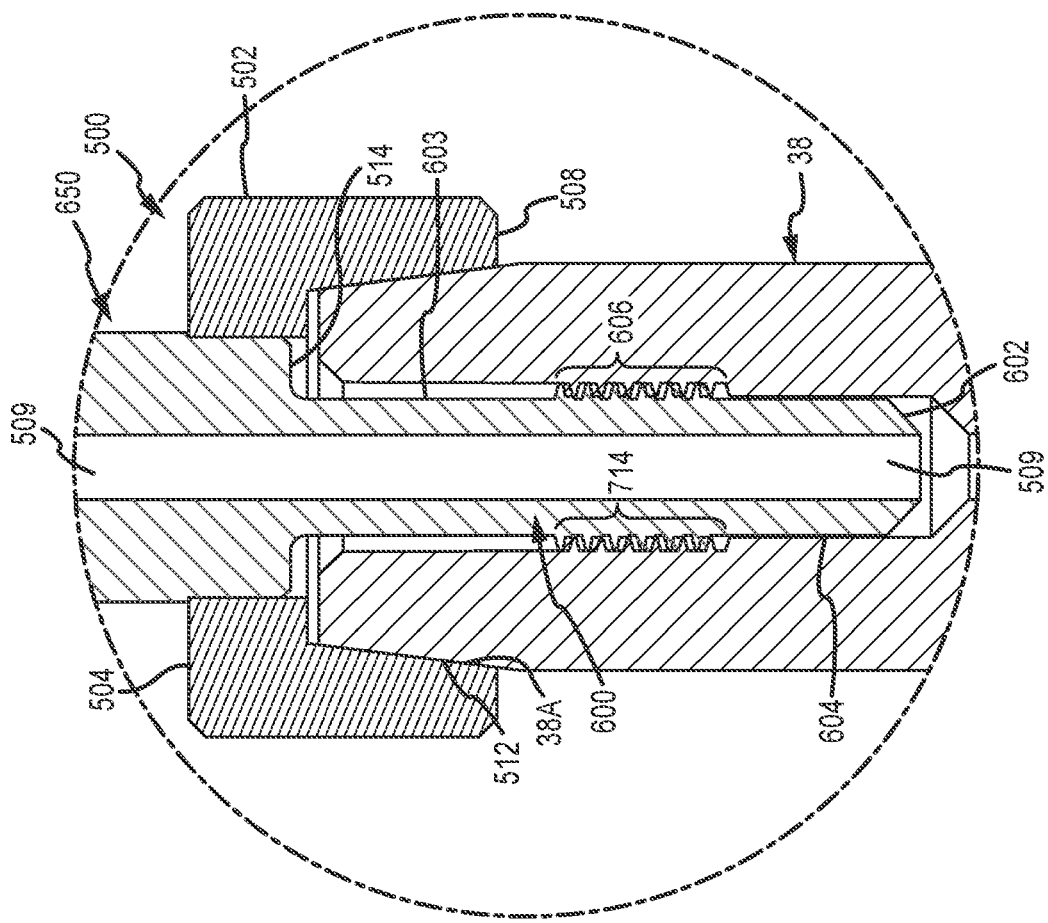
FIG. 10 is a close-up view of Section G of FIG. 9.
Figure 9:
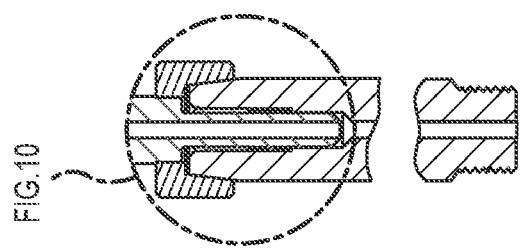
FIG. 9 is a partial, cross-sectional side view of a rotor/coupling connection in accordance with aspects of the invention.

As is illustrated in FIGS. 2 and 5, rotor shaft 38 has a first end 38A, a second end 38B, an outer surface 706 (that is preferably annular) and an inner passage 708 (which is optional depending upon the application) for transferring gas. Second end 38B preferably has a structure, such as a threaded end, for connecting to an impeller, although any suitable connection may be used. Shaft 38 may be a unitary structure or may be a plurality of pieces connected together.

First end 38A is dimensioned to receive projection 600 and to fit into cavity 510. First end 38A as shown has a chamfered end 700 that is received in cavity 510 so that top surface 708 is against surface 514 when the rotor shaft 44 and coupling 500 are assembled. First end 38A also has an opening 712 leading to inner passage 708, which includes threads 714 that threadingly engage threads 606. In this embodiment, inner passage 708 extends through, or essentially through, rotor shaft 38 to transfer gas to second end 38B so that gas may be released into molten metal in any suitable manner.

Rotor shaft 38 is connected to coupling 500 by aligning projection 600 with opening 712 and pushing projection into passage 708 until threads 606 meet threads 714, and then screwing rotor shaft 38 onto projection 600. Most preferably the respective threaded portions 606 and 714 are tightened in the same direction as the rotor shaft rotates during operation so that they do not loosen during operation.

Having thus described different embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A rotor shaft configured to connect to a coupling, the rotor shaft comprising:
    a first end configured to connect to the coupling, the first end comprising (a) an outer surface having a chamfer that is configured to be received in a cavity of the coupling, and (b) an internal bore, wherein there are no threads in the internal bore at the position of the chamfer and there are threads in the internal bore only beneath the position of the chamfer, wherein the threads are configured to receive threads of a protrusion extending from an opening of the coupling in order to be threadingly connected to the protrusion.

2. The rotor shaft of claim 1 that is comprised of one or more of the group consisting of: graphite and ceramic.

3. The rotor shaft of claim 1 that has an outer diameter of 3" and the first end is chamfered to reduce the outer diameter to 2¾" over a 1" to 1.5" length of the rotor shaft.

4. The rotor shaft of claim 1, wherein the bore has a first end and threads begin at least 1¼" past the first end of the bore.

5. The rotor shaft of claim 4, wherein the threads are square, 1", ACME threads.

6. The rotor shaft of claim 1, wherein the bore extends through the rotor shaft and is configured for the passage of gas to a second end of the rotor shaft.

7. The rotor shaft of claim 1 that has 1" ACME square threads.

8. The rotor shaft of claim 1 that has a second end and an exterior surface, wherein the exterior surface is threaded at the second end.

9. The rotor shaft of claim 1, wherein the outer surface of the first end is chamfered at a 45° angle.

10. The rotor shaft of claim 1, wherein the chamfered outer surface of the first end is 1"-1.5" in length.

11. The rotor shaft of claim 1, wherein the outer surface of the first end is chamfered at a 7° angle.

\* \* \* \* \*